United States Patent
Kalavar

(10) Patent No.: US 8,238,541 B1
(45) Date of Patent: Aug. 7, 2012

(54) INTENT BASED SKILL-SET CLASSIFICATION FOR ACCURATE, AUTOMATIC DETERMINATION OF AGENT SKILLS

(75) Inventor: Rajeev P. Kalavar, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 1727 days.

(21) Appl. No.: 11/344,733

(22) Filed: Jan. 31, 2006

(51) Int. Cl.
*H04M 3/00* (2006.01)

(52) U.S. Cl. .............. 379/265.06; 379/265.12

(58) Field of Classification Search ............. 379/265.09, 379/265.11, 265.12; 705/9, 11, 7.42; 709/224
See application file for complete search history.

(56) References Cited

U.S. PATENT DOCUMENTS

| | | |
|---|---|---|
| 4,163,124 A | 7/1979 | Jolissaint |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,008,930 A | 4/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,983 A | 11/1992 | Brown et al. |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,291,550 A | 3/1994 | Levy et al. |
| 5,299,260 A | 3/1994 | Shaio |
| 5,309,513 A | 5/1994 | Rose |
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |
| 5,444,774 A | 8/1995 | Friedes |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |

(Continued)

FOREIGN PATENT DOCUMENTS

CA 2143198 1/1995

(Continued)

OTHER PUBLICATIONS

U.S. Appl. No. 10/815,534, filed Mar. 31, 2004, Kiefhaber et al.

(Continued)

*Primary Examiner* — Yuwen Pan
*Assistant Examiner* — Sonia Gay
(74) *Attorney, Agent, or Firm* — Sheridan Ross P.C.

(57) ABSTRACT

The present invention is directed toward a method and system for determining the skill levels of an agent in a contact center. The invention creates a relationship between contact intent and agent skill to help determine agent skills based on successfully completed contacts.

18 Claims, 8 Drawing Sheets

U.S. PATENT DOCUMENTS

| | | |
|---|---|---|
| 5,544,232 A | 8/1996 | Baker et al. |
| 5,546,452 A | 8/1996 | Andrews et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,870 A | 11/1997 | Maloney et al. |
| 5,684,872 A | 11/1997 | Flockhart et al. |
| 5,684,874 A | 11/1997 | Yagyu et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,717,747 A | 2/1998 | Boyle, III et al. |
| 5,717,835 A | 2/1998 | Hellerstein |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A | 10/1998 | Fisher et al. |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,792 A | 5/1999 | Miloslavsky |
| 5,905,793 A | 5/1999 | Flockhart et al. |
| 5,915,012 A | 6/1999 | Miloslavsky |
| 5,926,538 A | 7/1999 | Deryugin et al. |
| 5,926,539 A | 7/1999 | Shtivelman |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,943,416 A | 8/1999 | Gisby |
| 5,948,065 A | 9/1999 | Eilert et al. |
| 5,953,332 A | 9/1999 | Miloslavsky |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,014,647 A | 1/2000 | Nizzari et al. |
| 6,035,332 A | 3/2000 | Ingrassia et al. |
| 6,038,293 A | 3/2000 | Mcnerney et al. |
| 6,044,144 A | 3/2000 | Becker et al. |
| 6,044,205 A | 3/2000 | Reed et al. |
| 6,044,355 A | 3/2000 | Crockett et al. |
| 6,046,762 A | 4/2000 | Sonesh et al. |
| 6,049,547 A | 4/2000 | Fisher et al. |
| 6,052,723 A | 4/2000 | Ginn |
| 6,055,308 A | 4/2000 | Miloslavsky et al. |
| 6,058,424 A | 5/2000 | Dixon et al. |
| 6,058,435 A | 5/2000 | Sassin et al. |
| 6,064,730 A | 5/2000 | Ginsberg |
| 6,064,731 A | 5/2000 | Flockhart et al. |
| 6,084,954 A | 7/2000 | Harless |
| 6,088,441 A | 7/2000 | Flockhart et al. |
| 6,115,462 A | 9/2000 | Servi et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,332 B1 | 5/2001 | Anderson et al. |
| 6,233,333 B1 | 5/2001 | Dezonmo |
| 6,240,417 B1 | 5/2001 | Eastwick |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,292,550 B1 | 9/2001 | Burritt |
| 6,295,353 B1 | 9/2001 | Flockhart et al. |
| 6,345,305 B1 | 2/2002 | Beck et al. |
| 6,353,810 B1 | 3/2002 | Pertrushin |
| 6,356,632 B1 | 3/2002 | Foster et al. |
| 6,366,668 B1 | 4/2002 | Borst et al. |
| 6,389,028 B1 | 5/2002 | Bondarenko et al. |
| 6,389,132 B1 | 5/2002 | Price |
| 6,389,400 B1 | 5/2002 | Bushey et al. |
| 6,424,709 B1 | 7/2002 | Doyle et al. |
| 6,426,950 B1 | 7/2002 | Mistry |
| 6,427,137 B2 | 7/2002 | Pertrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,453,346 B1 * | 9/2002 | Garg et al. .................... 709/224 |
| 6,463,148 B1 | 10/2002 | Brady |
| 6,463,346 B1 | 10/2002 | Flockhart et al. |
| 6,463,415 B2 | 10/2002 | St. John |
| 6,480,826 B2 | 11/2002 | Pertrushin |
| 6,490,350 B2 | 12/2002 | McDuff et al. |
| 6,493,695 B1 | 12/2002 | Pickering et al. |
| 6,535,600 B1 | 3/2003 | Fisher et al. |
| 6,535,601 B1 | 3/2003 | Flockhart et al. |
| 6,557,003 B1 | 4/2003 | Powers |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,597,685 B2 | 7/2003 | Miloslavsky et al. |
| 6,614,903 B1 | 9/2003 | Flockhart et al. |
| 6,650,748 B1 | 11/2003 | Edwards et al. |
| 6,671,263 B1 | 12/2003 | Potter et al. |
| 6,691,159 B1 | 2/2004 | Grewal et al. |
| 6,697,457 B2 | 2/2004 | Pertrushin |
| 6,704,409 B1 | 3/2004 | Dilip et al. |
| 6,704,410 B1 | 3/2004 | McFarlane et al. |
| 6,707,903 B2 | 3/2004 | Burok et al. |
| 6,744,877 B1 | 6/2004 | Edwards |
| 6,751,669 B1 | 6/2004 | Ahuja et al. |
| 6,754,333 B1 | 6/2004 | Flockhart et al. |
| 6,760,429 B1 | 7/2004 | Hung et al. |
| 6,766,013 B2 | 7/2004 | Flockhart et al. |
| 6,766,014 B2 | 7/2004 | Flockhart et al. |

| | | | |
|---|---|---|---|
| 6,865,267 B2 | 3/2005 | Dezonno | |
| 6,886,037 B1 | 4/2005 | Brewer et al. | |
| 6,947,543 B2 | 9/2005 | Alvarado et al. | |
| 6,965,868 B1 * | 11/2005 | Bednarek | 705/9 |
| 7,031,449 B1 | 4/2006 | Lundy et al. | |
| 7,035,808 B1 | 4/2006 | Ford | |
| 7,035,927 B2 | 4/2006 | Flockhart et al. | |
| 7,050,565 B2 | 5/2006 | Sylvain | |
| 7,110,525 B1 | 9/2006 | Heller et al. | |
| 7,200,219 B1 | 4/2007 | Edwards et al. | |
| 7,222,075 B2 | 5/2007 | Pertrushin | |
| 7,295,669 B1 | 11/2007 | Denton et al. | |
| 7,500,241 B1 | 3/2009 | Flockhart et al. | |
| 7,526,079 B2 | 4/2009 | Mello | |
| 2002/0032591 A1 | 3/2002 | Mahaffy et al. | |
| 2003/0093465 A1 | 5/2003 | Banerjee et al. | |
| 2003/0099343 A1 * | 5/2003 | Dezonno | 379/265.11 |
| 2003/0174830 A1 | 9/2003 | Boyer et al. | |
| 2003/0177017 A1 | 9/2003 | Boyer et al. | |
| 2004/0057569 A1 | 3/2004 | Busey et al. | |
| 2004/0203878 A1 | 10/2004 | Thomson | |
| 2005/0071211 A1 | 3/2005 | Flockhart et al. | |
| 2005/0071212 A1 | 3/2005 | Flockhart et al. | |
| 2005/0071241 A1 | 3/2005 | Flockhart et al. | |
| 2005/0071844 A1 | 3/2005 | Flockhart et al. | |
| 2006/0015388 A1 | 1/2006 | Flockhart et al. | |
| 2006/0182252 A1 | 8/2006 | Harris et al. | |
| 2006/0182258 A1 * | 8/2006 | Sisselman et al. | 379/265.02 |
| 2008/0175372 A1 * | 7/2008 | Brunet et al. | 379/265.09 |
| 2009/0187455 A1 * | 7/2009 | Fernandes et al. | 705/9 |

FOREIGN PATENT DOCUMENTS

| | | |
|---|---|---|
| CA | 2174762 | 6/1995 |
| EP | 0 501 189 A2 | 9/1992 |
| EP | 0 740 450 A2 | 10/1996 |
| EP | 0 772 335 A2 | 5/1997 |
| EP | 0 855 826 A2 | 7/1998 |
| EP | 0 863 651 A2 | 9/1998 |
| EP | 0829996 A2 | 9/1998 |
| EP | 0866407 A1 | 9/1998 |
| EP | 899673 A2 | 3/1999 |
| EP | 998108 A1 | 5/2000 |
| EP | 1091307 A2 | 4/2001 |
| EP | 1150236 | 10/2001 |
| GB | 2 273 418 | 6/1994 |
| GB | 2 290 192 A | 12/1995 |
| WO | WO 96/07141 | 3/1996 |
| WO | WO 97/28635 | 8/1997 |
| WO | PCT/SE98/01074 | 12/1998 |
| WO | WO 98/56207 | 12/1998 |

OTHER PUBLICATIONS

U.S. Appl. No. 10/815,566, filed Mar. 31, 2004, Kiefhaber et al.
U.S. Appl. No. 10/815,584, filed Mar. 31, 2004, Kiefhaber et al.
U.S. Appl. No. 10/861,193, filed Jun. 3, 2004, Kiefhaber et al.
U.S. Appl. No. 10/946,638, filed Sep. 20, 2004, Flockhart et al.
U.S. Appl. No. 11/243,436, filed Oct. 3, 2005, Kalavar.
U.S. Appl. No. 11/243,437, filed Oct. 3, 2005, Hunter et al.
U.S. Appl. No. 11/243,435, field Oct. 3, 2005, Kalavar.
"Product Features," Guide to Call Center Automation, Brock Control Systems, Inc., Activity Managers Series™, Section 5—Company B120, p. 59, 1992.
"Product Features," Guide to Call Center Automation, CRC Information Systems, Inc., Tel-ATHENA, Section 5—Company C520, p. 95, 1992.
Dawson, "NPRI's Powerguide, Software Overview" Call Center Magazine (Jun. 1993), p. 85.
"Applications, NPRI's Predictive Dialing Package," Computer Technology (Fall 1993), p. 86.
"Call Center Software You Can't Outgrow," Telemarketing® (Jul. 1993), p. 105.
"VAST™, Voicelink Application Software for Teleservicing®," System Manager User's Guide, Digital Systems (1994), pp. ii, vii-ix, 1-2, 2-41 through 2-77.

GEOTEL Communications Corporation Web site printout entitled "Intelligent CallRouter" Optimizing the Interaction Between Customers and Answering Resources. 6 pages.
L.F. Lamel and J.L. Gauvain, Language Identification Using Phone-Based Acoustic Likelihood, ICASSP-94, 4 pages.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.
Levent M. Arsian, Foreign Accent Classification in American English, Department of Electrical Computer Engineering, Duke University, Thesis, pp. 1-200 (1996).
E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz 8 pages.
Presentation by Victor Zue, The MIT Ox90ygen Project, MIT Laboratory for Computer Science (Apr. 25-26, 2000) 9 pages.
MIT Project Oxygen, Pervasive, Human-Centered Computing (MIT Laboratory for Computer Science) (Jun. 2000) pp. 1-15.
Examiner's Refusal Decision dated Jul. 4, 2005 in Japanese Patent App. No. 2000-34266.
Examiner's Refusal Decision for Japanese Patent Application No. 2000-34267 dated Mar. 9, 2005 with translation, 4 pages.
Avaya, Inc. Business Advocate Product Summary, at http://www.avaya.com, downloaded on Feb. 15, 2003, Avaya, Inc. 2003, 3 pages.
Avaya, Inc. Business Advocate Options, at http://www.avaya.com, downloaded on Feb. 15, 2003, Avaya, Inc. 2003.
Avaya, Inc. CentreVu Advocate, Release 9, User Guide, Dec. 2000.
"Internet Protocol Addressing," available at http://samspade.org/d/ipdns.html, downloaded Mar. 31, 2003, 9 pages.
"Domain Name Services," available at http://www.pism.com/chapt09/chapt09.html, downloaded Mar. 31, 2003, 21 pages.
Bellsouth Corp., "Frequently Asked Questions—What is a registrar?," available at https://registration.bellsouth.net/NASApp/DNSWebUI/FAQ.jsp, downloaded Mar. 31, 2003, 4 pages.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
Coles, Scott, "A Guide for Ensuring Service Quality In IP Voice Networks," Avaya, Inc., 2002, pp. 1-17.
Avaya, Inc., "The Advantages of Load Balancing in the Multi-Call Center Enterprise," Avaya, Inc., 2002, 14 pages.
Foster, Robin, et al., "Avaya Business Advocate and its Relationship to Multi-Site Load Balancing Applications," Avaya, Inc., Mar. 2002, 14 pages.
Chavez, David, et al., "Avaya MultiVantage Software: Adapting Proven Call Processing for the Transition to Converged IP Networks," Avaya, Inc., Aug. 2002.
Avaya, Inc., "Voice Over IP Via Virtual Private Networks: An Overview," Avaya, Inc., Feb. 2001, 9 pages.
Avaya, Inc., "Better Implementation of IP in Large Networks," Avaya, Inc. 2002, 14 pages.
Stevenson et al.; "Name Resolution in Network and Systems Management Environments"; http://netman.cit.buffalo.edu/Doc/DStevenson/NR-NMSE.html; 16 pages.
Doo-Hyun Kim et al. "Collaborative Multimedia Middleware Architecture and Advanced Internet Call Center," Proceedings at the International Conference on Information Networking (Jan. 31, 2001), pp. 246-250.
"When Talk Isn't Cheap," Sm@rt Reseller, v. 3, n. 13 (Apr. 3, 2000), p. 50.
"eGain's Commerce 2000 Platform Sets New Standard for eCommerce Customer Communications," Business Wire (Nov. 15, 1999), 3 pages.

* cited by examiner

300

| Work Item Container | | | |
|---|---|---|---|
| Intent | Point Value | Relevance | Weighted Value |
| Intent 1 | 10 | 90% | .9 |
| Intent 2 | 10 | 85% | .85 |
| Intent 3 | 10 | 10% | .1 |
| ⋮ | ⋮ | ⋮ | ⋮ |
| Intent K | 10 | 25% | .25 |

320 Agent Container
324 — First Name
328 — Middle Name
332 — Last Name
336 — ...

| Skill | Point Value | Related Intent |
|---|---|---|
| Skill 1 | 100 | Intent 1, 3, 5, and K |
| Skill 2 | 20 | Intent 2 and 7 |
| Skill 3 | 55 | Intent 1, 2, and 3 |
| ⋮ | ⋮ | ⋮ |
| Skill L | 200 | Intent 2 |

| Currently Identified Intent(s) | Currently Unresolved Interactions |
|---|---|
| First Intent | Interaction A<br>Interaction B<br>⋮ |
| Mth Intent | Interaction C<br>Interaction D<br>Interaction E<br>⋮ |

*Fig. 6*

| Intents | Resolved Interaction | Corresponding Resolution Data |
|---|---|---|
| First Intent | Interaction F<br>Interaction G<br>⋮ | Resolution Data F<br>Resolution Data G<br>⋮ |
| Nth Intent | Interaction H<br>Interaction I<br>⋮ | Resolution Data H<br>Resolution Data I<br>⋮ |

*Fig. 7*

| Skill | Intent |
|---|---|
| First Skill | First Intent |
| Second Skill | Second Intent<br>Third Intent<br>⋮ |
| ⋮ | ⋮ |
| Lth Skill | Nth Intent |

*Fig. 9*

INTENT BASED SKILL-SET CLASSIFICATION FOR ACCURATE, AUTOMATIC DETERMINATION OF AGENT SKILLS

FIELD

The invention relates generally to servicing interactions in a contact center and specifically to automatically determining and/or updating a skill level of an agent in a contact center.

BACKGROUND

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria.

Typically, when a contact enters a contact center, an IVR or content analyzer evaluates the content of the contact to determine the intent(s) defined by the contact's content. As used herein, "contact" or "interaction" refers to an atomic unit of work arriving at a contact center over a particular media channel or via implementation of a specific business process (activity), and an "intent" refers to a (typically detailed) topic of a particular customer escalated interaction. Normally, "intent" refers to at least a portion of the context defined by the contact's or interaction's content. An interaction may have one or more intents specified in its content. For example, a customer may send an email having a subject of "Lexus information needed" and a body (content) setting forth two questions, namely one asking about the price of a Lexus 470 and the other asking about the mileage per gallon of the RX-330. While the subject provides the topic (which is about the Lexus), analyzing the content leads to the more granular intent(s) (which are queries about two differing automotive models).

Content analyzers analyze content using natural language processing techniques. They determine the intent(s) defined by the content of an interaction and assign a percentage accuracy for each identified intent. They are generally neural network-based and may require supervised training as part of their tuning process. However, once tuned, the content analyzer can fairly accurately determine the intent(s) of complex contacts.

Once the intent for a particular contact has been determined, the contact center server analyzes the skill levels of agents that are currently available to handle the contact. If the contact is directed towards a relatively simple skill, then almost any agent working in the contact center should be able to successfully handle the instant contact. However, when a very complex contact enters the contact center, there may only be a couple of agents in the contact center that are qualified to handle the contact. Agent's qualifications are normally represented by skill levels of the agent maintained in a skill-to-agent or agent-to-skill mapping table. Agents may have multiple skills and thus are qualified to handle a larger number of contacts than an agent who only has one skill. "Skills" and "skill levels" are normally assigned based on agent performance in handling interactions, the subject matter that the agent deals with, the agent's competence in providing the end customer with the correct data, the time that the agent has spent resolving a particular interaction, customer feedback on the level of service provided by the agent, the agent's demonstrated expertise on a helper application and the agent's expertise/comfort handing interactions of a particular media (such as a voice call or chat message, etc). An agent moves up the levels of skill in a selected skill type and is qualified in differing types of skill in response to servicing interactions. To facilitate interaction processing, hunt groups or queues are often defined for each skill type, with agents having a selected skill being assigned to the corresponding hunt group of queue. The server determines, based on the identified intent(s) and analyzed content of the contact, what skills and/or corresponding skill levels are necessary to have the contact successfully resolved. These required skills and/or corresponding skill levels are compared against the skills and corresponding skill levels of the agents within the contact center. If there is an agent available that has the minimum necessary skills and corresponding skill levels to handle the contact, then the server routes the contact to that available agent for service. If the minimum skill level required for the contact is higher such that no available agents meet the minimum skill qualifications, then the contact is placed in one of the qualified agent's contact queues. This may ultimately lead to a long wait time for contacts requiring high skill levels.

One problem experienced in contact centers is the categorization of different skills in a manner that can then be used correctly to determine the actual skill level of the agent. A contact center manager is generally able to define only a finite number of "skills" into which all agents must fall. Because this is a manual process, it must be maintainable, thereby limiting the number of skills/skill levels that may be defined. This limitation means that the routing algorithm frequently has inaccurate or incomplete data in routing an interaction to an appropriate agent. Unless the skills are highly granularized, it is difficult to identify with certainty which agent has the actual skills. Accordingly, most of today's systems essentially rely on a "best-effort" determination of skills when making a routing decision (by hoping that hunt groups and queues defined are accurate enough).

Even if skills and skill levels can be defined with sufficient granularity, another problem with current contact centers is that contacts can only be assigned to agents based on the contact center's best available knowledge of the agent skills and/or skill levels. Unfortunately, these skill levels may not be truly representative of the actual capabilities of the agents. This occurs because the skill levels are typically determined and assigned by having a supervisor review the agent as they work. These "audits" are performed periodically to determine the current skill levels of agents in the contact center. To accurately audit an agent, a supervisor needs to observe the agent over the course of days, if not weeks. Spending this much time to determine skill levels of agents is not very efficient. The alternative is to observe an agent for a smaller amount of time like minutes or hours, and assume that a representative number of contacts involving a selected skill or skill level have been presented and resolved by the agent. More often than not, these audits do not accurately determine the actual skill types and skill levels of a particular agent. For example, if during the audit no contact were assigned to the agent relating to skill X, then the supervisor cannot award the agent points relating to skill X even though the agent might be able to successfully resolve a contact utilizing skill X. More so, it is extremely time consuming to have a supervisor continually auditing agents in an attempt to maintain updated skill levels for every agent.

There have been some attempts to solve this problem. Specifically, there are some methods that try to automatically measure an agent's skill levels. One such attempt utilizes metrics associated with certain tools that an agent might use to measure how skilled the agent is. Essentially, a soft skill is created by measuring an agent's ability with a tool used to handle contacts. These tool skills are then indirectly associated to contact required skills. This approach assumes that, if an agent is skilled with a particular tool, that agent is equally skilled at handling contacts that require that particular tool. For example, an agent's typing speed and search efficiency may be easily measured without human supervision. The assumption is that as the agent becomes faster at typing and more efficient during their key word searches then they are more skilled at handling any type of contact that requires these skills.

The problem with these existing solutions is that they attempt to make a hard determination about an agent's skills based on assumptions. These assumptions can break down in many circumstances. Consider an agent who is very good at key word searches relating to car insurance issues. This agent may have the highest possible skill level for searching, because he/she has been measured to resolve many car insurance issues quickly using the search tool. When a contact enters the contact center, and that contact is directed toward life insurance issues, the contact routing engine would probably assume that the agent who is very good at searching car insurance issues is also good at searching life insurance issues. This is not necessarily the case, as many differences exist between doing a life insurance issue search and a car insurance issue search. However, since the assumption is made between tool skills and actual skills, the contact routing engine will probably assign the contact to the skilled car insurance searcher when there may be a better life insurance searching agent available. This can lead to inefficiencies and confusion within the contact center because the agent's skills have been wrongfully assumed.

The real problem lies in trying to determine the true knowledge of an agent in a contact center, rather than trying to correlate soft skills (e.g., tool based skills) to actual agent knowledge. It is inaccurate to try and relate tool-based skills to knowledge-based skills, and the known methods of actually measuring knowledge-based skills are inefficient and costly. There exists a need for a method and system that automatically determines an agent's actual skill level with accuracy, and continually updates those skills so that the next incoming contact can be assigned to an agent based on the most up to date agent skill information.

Even if skills and skill levels were to be efficiently and effectively administered, contact center inefficiencies result from the contact center's failure to understand, on a real- or near real-time basis, what types of intents are being or have been serviced by another agent. When different agents handle interactions from different customers having similar intent, each agent may ultimately arrive at the same solution, with the interactions being serviced in a similar manner. Unfortunately, none of the agents have the knowledge that a similar issue was previously (or just) resolved by another agent and that the resolution might be identical to the one that a servicing agent is going to arrive at as that agent continues to work on an assigned interaction. Consider the following scenario where agents, at different sites, are assigned similar interactions. Agent A is assigned five emails while agent B is assigned three. As such, agent B reaches the email with similar intent before agent A and, after a few hours, performs the steps needed to research and resolve the email issue. Just before agent B has resolved the issue, agent A starts servicing the email with similar intent and does a manual search in the database to determine if there were any previous resolutions around the email topic. Finding none, agent A proceeds to research the issue. If agent B completes his email just after agent A has determined that there is no record of a similar issue resolution in the company's database, the contact center is confronted with a situation where agent B's resolution may be recorded, but agent A duplicates the entire work by researching and arriving with resolution steps that agent B has already identified. As can be seen from the above example, even if a search capability exists the search capability needs not only to be able to search for previous resolutions accurately but also to encompass unresolved interactions being handled by other agents when the search is being performed. The failure to provide an efficient and effective search capability can lead not only to less efficient utilization of contact center resources (by the need to "recreate the wheel") but also to inconsistent results by different agents.

SUMMARY

The present invention is directed generally to the use of content analysis to identify intent(s) in contacts, which may be used not only in contact processing but also in administering agent skills.

In one embodiment, the present invention is directed to a method for determining a skill level of a first agent. The method includes the steps of:

(a) receiving an incoming or outgoing customer contact;
(b) determining one or more intents of the contact;
(c) connecting the contact with an agent; and
(d) after the agent has serviced the contact, updating the servicing agent's set of skills to indicate that the agent has increased proficiency in a skill and/or a skill level.

Intent is used to generate and dynamically update the agent skill table. In other words, each intent is mapped to a corresponding agent skill to provide not only ease of contact routing but also skill administration. Intents identify the context and therefore the actual problem for which the interaction has been escalated. The embodiment reflects the fact that, if an agent can resolve a particular work item or interaction, he or she is skilled in the subject matter (e.g., intents) contained within the interaction. Thus, after a successful resolution of a contact the agent's skill or skill levels is generally increased based on the contact's intent(s). This methodology permits the agent skill levels to be accurately modified to reflect on-the-job training without the substantial involvement of contact center administrators and agent downtime from testing with a helper application.

To alter the skill level, a point value can be assigned to each of the intents in the contact. The skill level can be increased by all or a portion of the point value. For example, if a contact has three intents, each with an assigned point value of ten, a degree of relevance can be used to provide a weighted value for each intent. As discussed below, the "degree of relevance" can mean many things depending on the application, but commonly refers to the probability that the intent has been accurately identified as being part of the contact (e.g., the percent accuracy for each intent assigned by a content analyzer). When the contact is successfully serviced (e.g., as determined by agent input, wrapup data indicating successful resolution, and the like), a weighted value is added to the agent's cumulative skill level score for each of the skills mapping to the intents. Ultimately over time, the score for a skill or a set of skills may cross a skill level threshold, causing the agent to be bumped up to the next highest skill level. To provide a level of significance to the skill level adjustment, a threshold significance value can be used to condition whether or not an intent is material enough to warrant updating the agent's skill level corresponding to the intent. In other words, if the weighted intent score is 2.5 and the threshold is 5 the agent's skill for that intent is not updated as the intent is deemed to be an insignificant part of the interaction.

This embodiment allows a contact center to accurately and efficiently classify skills, thereby providing accurate routing decisions that ultimately lead to more optimal agent assignments. Intents permit the contact center to completely determine the true subject matter expertise of any agent. Agents that resolve an interaction automatically get assigned the intent associated with the resolved interaction. Additionally, the use of intents permits a greater degree of granularity in skill administration without requiring involvement by contact center administrators.

In a second embodiment, a method for servicing an incoming or outgoing contact is provided that includes the steps of:
 (a) receiving a customer contact;
 (b) determining at least a first intent of the contact;
 (c) updating a first set of data structures mapping intents to active contacts to associate the first intent with the contact;
 (d) when the first contact is serviced, associating resolution information from servicing the contact with the first intent;
 (e) identifying at least a second unserviced contact also having the first intent; and
 (f) notifying a second agent (assigned to service the second contact) of the resolution information.

This embodiment can automatically and accurately provide an agent with a solution set based on similar intent. The agent is not required to research or otherwise manually search for the issue using free-form queries where accuracy is dependent on the query string. The methodology can narrow down the research field, leading to quicker resolution times. It can also provide agents, at the time of work item assignment and/or thereafter, with a real-time or near real-time insight into resolutions of tasks/work items that are similar to what they may be currently assigned, with the expectation that these similarities will allow the agent to resolve the assigned interactions far more quickly and efficiently.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

FIG. 3A is a logical representation of data in a work item container in accordance with embodiments of the present invention;

FIG. 3B is a logical representation of data in an agent container in accordance with embodiments of the present invention;

FIG. 6 is a set of data structures mapping currently identified intent against corresponding unresolved interactions;

FIG. 7 is a set of data structures mapping intents against resolved interaction and resolution data;

FIG. 9 is a set of data structures mapping skill against intent.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to automatically determine and update skill levels of an agent in the communication system.

Figure 1:
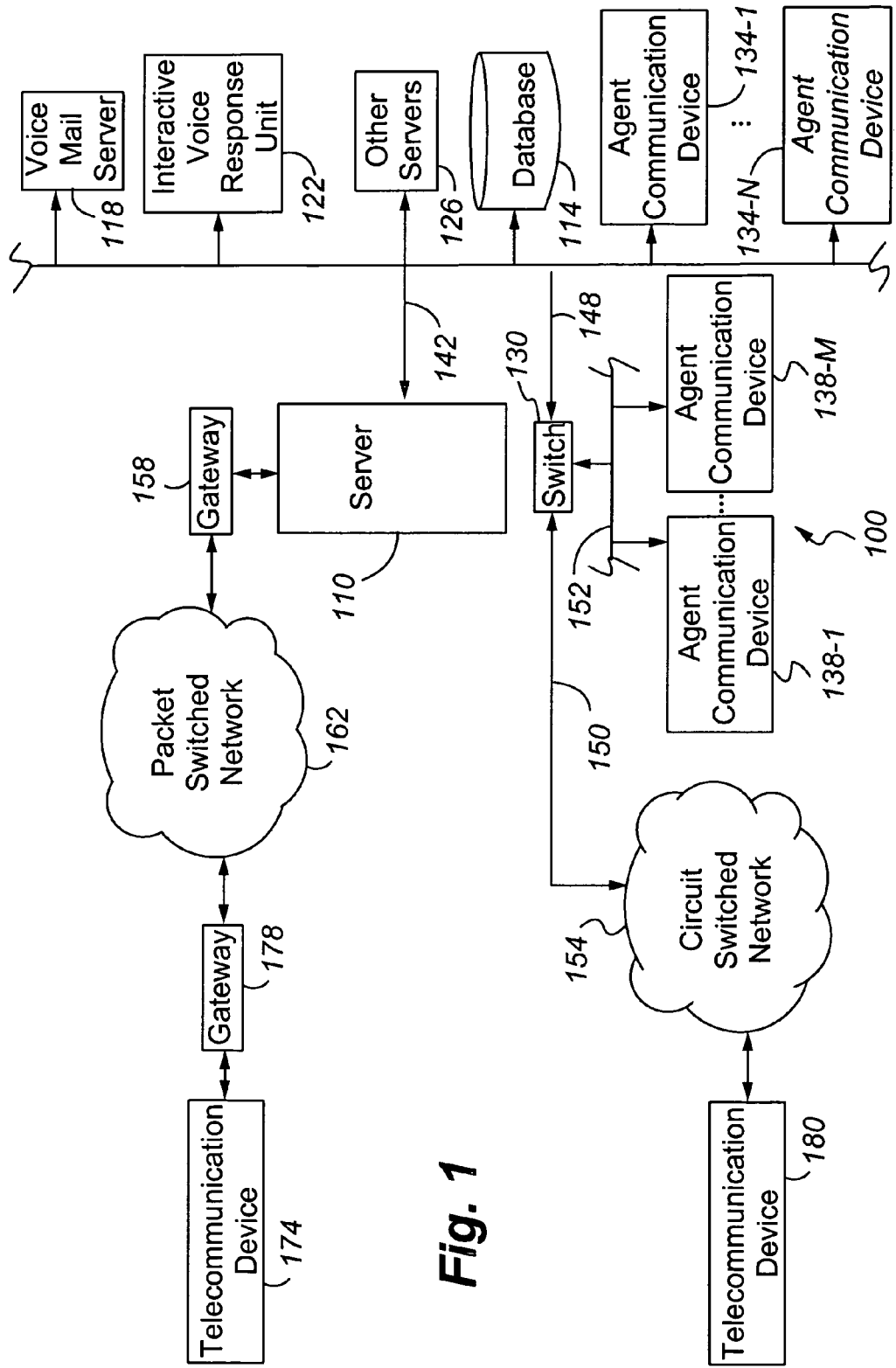
FIG. 1 is a block diagram depicting a contact center in accordance with embodiments of the present invention.

FIG. 1 shows an illustrative embodiment of the present invention. A contact center 100 comprises a central server 110, a set of data stores or databases 114 containing contact or customer related information and other information that can enhance the value and efficiency of the contact, and a plurality of servers, namely a voice mail server 118, an Interactive Voice Response unit or IVR 122, and other servers 126, a switch 130, a plurality of working agents (not shown) operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers 126 can be connected via optional communication lines 148 to the switch 130. As will be appreciated, the other servers 126 can also include a scanner (which is normally not connected to the switch 130 or Web server), VoIP software, video contact software, voice messaging software, an IP voice server, a fax server, a web server, and an email server, SMTP and POP3 servers for relaying and receiving emails respectively, chat server to host chat sessions, instant messaging gateways, SMS/MMS gateways for receiving SMS/MMS messages through a mobile device, context analysis appliances, autoresponders, VoIP gateways, and the like.

The switch 130 is connected via a plurality of trunks 150 to the Public Switch Telecommunication Network (PSTN) 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, an enterprise server, or other type of telecommunications system switch or server, as well as other types of processor-based communication control devices such as media servers, computers, adjuncts, etc.

Referring to FIG. 1, the gateway 158 can be any suitable gateway device, such as Avaya Inc.'s, G700™, G600™, MCC/SCC™ media gateways and may be implemented as hardware such as via an adjunct processor (as shown) or as a chip in the server.

The first telecommunication devices 134-1 . . . 134-N are packet-switched and can include, for example, IP hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1 . . . 138-M are circuit-switched. Each of the telecommunication devices 138-1 . . . 138-M corresponds to one of a set of internal extensions. The switch/server can direct incoming contacts to and receive outgoing contacts from these extensions in a conventional manner. The second telecommunication devices can include, for example, wired and wireless telephones, PDAs, H.320 video phones and conferencing units, voice messaging and response units, and traditional computer telephony adjuncts.

It should be noted that the invention does not require any particular type of information transport medium between switch or server and first and second telecommunication devices, i.e., the invention may be implemented with any desired type of transport medium as well as combinations of different types of transport media.

The packet-switched network 162 can be any data and/or distributed processing network, such as the Internet. The network 162 typically includes proxies (not shown), registrars (not shown), and routers (not shown) for managing packet flows. The packet-switched network 162 is in communication with an external first telecommunication device 174 via a gateway 178, and the circuit-switched network 154 with an external second telecommunication device 180. These telecommunication devices are referred to as "external" in that they are not directly supported as telecommunication device endpoints by the switch or server. The telecommunication devices 174 and 180 are an example of devices more generally referred to herein as "external endpoints."

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements.

Figure 2:
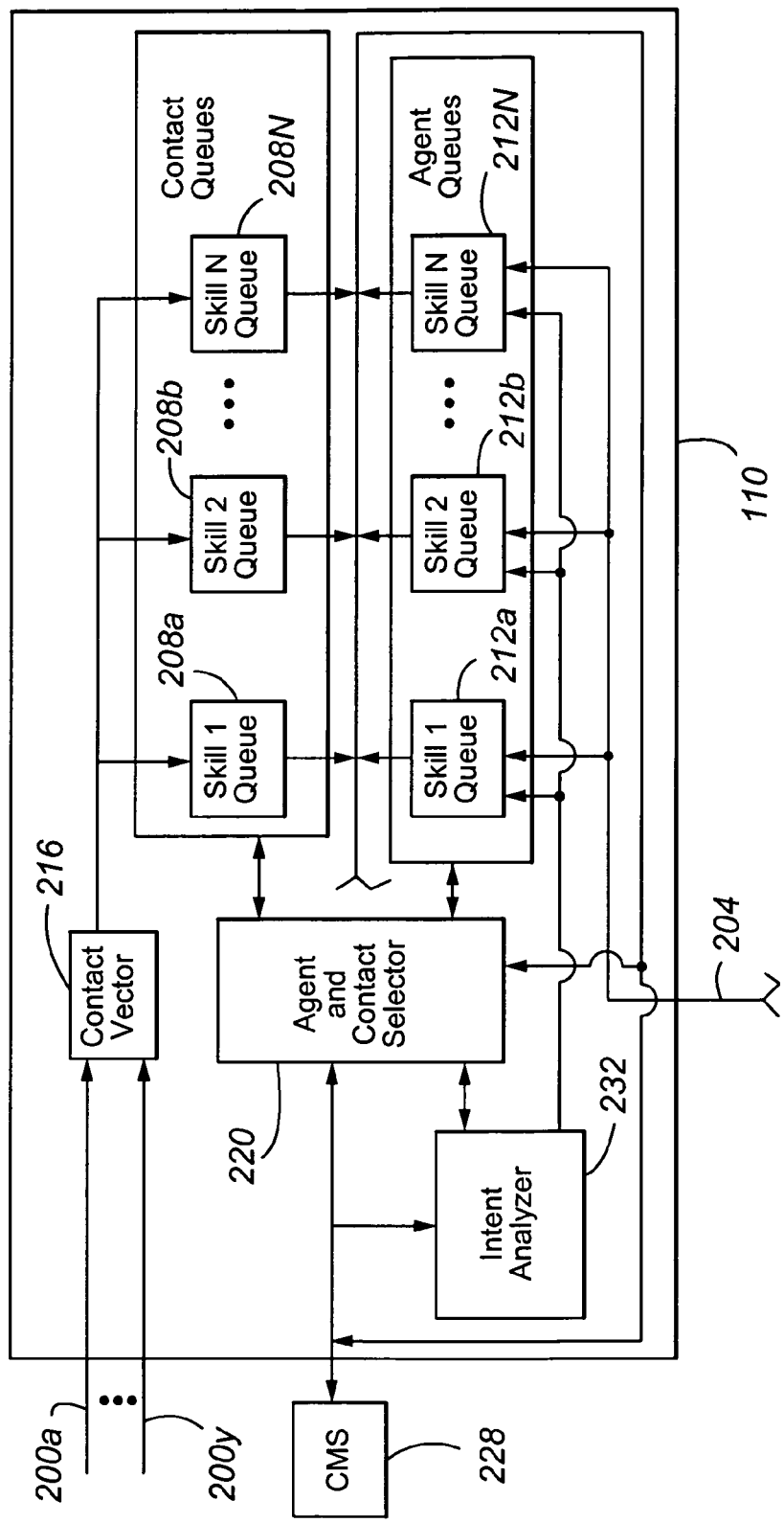
FIG. 2 is a block diagram depicting a server in accordance with embodiments of the present invention.

Referring to FIG. 2, one possible configuration of the server 110 is depicted. The server 110 is in communication with a plurality of customer communication lines $200a$-$y$ (which can be one or more trunks, phone lines, etc.) and agent communication line 204 (which can be a voice-and-data transmission line such as LAN 142 and/or a circuit switched voice line 140). The server 110 can include a Call Management System™ or CMS 228 that gathers call records and contact-center statistics for use in generating contact-center reports.

Included among the data stored in the server 110 are a set of contact queues $208a$-$n$ and a separate set of agent queues $212a$-$n$. Each contact queue $208a$-$n$ corresponds to a different set of agent skills, as does each agent queue $212a$-$n$. Conventionally, contacts are prioritized and either are enqueued in individual ones of the contact queues $208a$-$n$ in their order of priority or are enqueued in different ones of a plurality of contact queues that correspond to a different priority. Contacts in a common queue need not be of the same media type. For example, one contact queue could contain VoIP calls, telephone calls, emails, and chats. Furthermore, a single contact could be a physical representation of a grouping of different media types, e.g., one contact may be a grouping of emails and calls from a similar customer or even from different customers related to the same subject matter. Likewise, each agent's skills are prioritized according to his or her level of expertise in that skill, and either agents are enqueued in individual one of agent queues $212a$-$n$ in their order of expertise level or are enqueued in different ones of a plurality of agent queues $212a$-$n$ that correspond to a skill and each one of which corresponds to a different expertise or skill level. Included among the control programs in the server 110 is a contact vector 216. Contacts incoming to the contact center are assigned by contact vector 216 to different contact queues $208a$-$n$ based upon a number of predetermined criteria, including customer identity, customer needs, contact center needs, current contact center queue lengths, contact media type, customer value, and the agent skill that is required for the proper handling of the contact. Agents who are available for handling contacts are assigned to agent queues $212a$-$n$ based upon the skills that they possess. An agent may have multiple skills, and hence may be assigned to multiple agent queues $212a$-$n$ simultaneously. Furthermore, an agent may have different levels of skill expertise (e.g., skill levels 1-N in one configuration or merely primary skills and secondary skills in another configuration), and hence may be assigned to different agent queues $212a$-$n$ at different expertise levels. Additionally, agents can be non-human contact handling media. For instance, a recording device may be the "agent" that a contact is directed to as an intermediate step to assigning a human agent to processing the contact. The definition of agent need not be limited to human contact servicing agents.

The server 110 includes an intent analyzer 232 that, in a preferred embodiment, is a modified content analyzer. When a contact enters the contact center, the intent analyzer 232 parses the content of the contact and, based on the parsed content, determines the intent(s) associated with the contact and the probability, or likelihood, that the determined intent(s) is correct and/or degree of relevance of the identified intent(s) to the interaction. This determination of relevance of the intent(s) to the contact can be in the form of percent relevance, weighted relevance, percentage accuracy, weighted accuracy, any mathematical output when using algorithms that allow comparison/relevance computation, or combinations thereof.

There exist many ways to determine the relevance of intents associated with a given contact. Some methods are closely related to key word searches that are performed by searching algorithms. The greater number of times a key word associated with a given intent is found in the contact, the more likely that contact has the given intent. The server 110 is designed such that it does not assume that it knows all intents of a given contact with absolute precision. Rather, the server 110, utilizing the intent analyzer 232, is able to quantify how accurately it thinks it has determined the intent associated with a particular contact. For example, if a keyword associated with a first intent occurs three times in a given contact and another keyword associated with a second intent occurs thirty times in the same contact, the likelihood that the second intent is included in the contact is greater than the likelihood that the first intent is included in the contact.

Alternatively, relevance can be determined relative to other determined possible intents in a particular contact. For instance, the intent analyzer 232 can determine that there might be five intents associated with a contact. Furthermore, the intent analyzer 232 can rank each determined intent such that the most relevant intent (e.g., the intent that had the most, or the best, keywords occur in the contact) has the highest ranking, and the next most relevant intent has the second highest ranking, and so forth. Once rankings are established, a percent weight can be applied to each intent such that the highest-ranking intent has a higher percent relevance than the others. The percentages given to the five intents may sum to one hundred percent, but this is not necessarily required. As can be appreciated, two or more intents can be equally relevant and thus can each be given the same ranking. This may result in each equally ranked intent being given the same amount of percent relevance. For example, intents 1, 2, and 3 may each be determined to be equally relevant and intents 4 and 5 may be equally less relevant. The percent relevance applied to intents 1, 2, and 3 can be 30% each, while the percentage relevance applied to intents 4 and 5 may be 5% each for a combined percent relevance of 100%. Alternatively, intents 1, 2, and 3 can each be given 90% relevancy while intents 4 and 5 can be given 20% relevancy.

Each intent of the contact may maintain its applied percent relevance as given by the intent analyzer 232. Alternatively, the intent analyzer 232 may also apply absolute points to each intent based upon its absolute relevance to the contact or relative relevance among all determined intents. Continuing the example above, intents 1, 2, and 3 may each be given three relevance points each while intents 4 and 5 only receive 1 relevance point each. The assignment of points to the intents is completely arbitrary, as long as a logical order if followed that can be applied to update agent skills upon successful completion of the contact. For example, intents that are considered the most relevant may be given the least amount of points and the least relevant intent may receive the most points of any intent identified in the contact. Furthermore, intents that are associated with more difficult skills may receive more (or less) points than other skills that are less difficult.

The intent analyzer 232 may also be equipped with speech/text converters so that voice contacts can be analyzed for their intent. The intent analyzer 232 may also utilize a content analyzer, which analyzes voice signals directly, thus making the intent analyzer less dependent upon text searches.

Another purpose of the intent analyzer 232 is to (a) relate or associate the determined intents with the data structures or work item container representing the contact, (b) generate, on a real-time or near real-time basis, an intent-to-interactions set of data structures that, for each identified (and/or predetermined) intent, provides a corresponding set of current (unresolved) interactions containing the intent, (c) map the determined intents to the skills of agents in the contact center to select an appropriate agent and/or route point for the contact, (d) when a particular interaction is resolved (or serviced) extract the resolution data (e.g., steps followed to resolve interaction, resolution provided to customer, wrap-up data providing more information on the resolution, and other information relating to how the interaction was resolved) and identify the intents of the interaction recorded in the interaction's data structures, (e) for each resolved interaction, generate (using the real-time or near real-time mapping from (b)) generate a result-set of interactions currently assigned to other agents having a similar intent, (f) proactively notify the agents currently servicing an interaction having an intent in the recently resolved interaction of a potential solution, and (g) when a particular interaction is resolved (or serviced), automatically update the respective agent's skill qualifications to reflect at least some of the intents contained in the resolved contact.

An important aspect of resolving the interaction is mapping the identified intent(s) to the agent skills. The intent analyzer 232 identifies the skills associated with each of the identified intents by performing intent-to-skill matching using a set of data structures, such as that shown in FIG. 9. There may be skills that have multiple intents associated with them, whereas other skills may only have one intent. For example, the second skill corresponds to the second and third intents while the first skill corresponds only to the first intent. Although not shown in FIG. 9, one intent may be associated with several skills.

A further purpose of the intent analyzer 232 is to forward this information to the agent and contact selector 220, such that the agent and contact selector 220 can assign the contact to the best or optimal agent or skill queue 208a-n. The agent and contact selector 220 will assign the contact to a given agent, queue, or other route point based upon the most relevant, determined intents. Which intent is the most relevant can be determined by comparing the degree of relevance associated with the intent against a selected threshold. Preferably, a contact is not assigned to a particular queue based solely on an intent that the intent analyzer 232 is not very sure of. It would be more advantageous to have the agent and contact selector 220 assign the contact based upon the more relevant determined intents. In other words, the interaction is routed to an agent having the skills corresponding to the more relevant determined intents while the skills corresponding to the less relevant determined intents are generally not considered in agent selection.

The intent analyzer 232 then waits until an agent has completed a given contact. Once the contact has been successfully completed the intent analyzer 232 utilizes the mapping between the determined intents and agent skills to automatically update the agent's skills. There are several different ways that an agent's skills can be updated. For instance, only intents that met a certain percent relevance, or point threshold are considered and thus only those skills that correspond to the considered intents are given the points for successfully completing the contact. The intent analyzer 232 may also apply the points to each skill based upon weighting of each intent's percent relevance or points that were initially determined when the contact entered the contact center. By selectively awarding points to the agent's skills based on thresholds, the chances of applying points to skills that were not actually used by the agent while servicing the contact are decreased. It is possible to simply apply points to every skill that may have been associated with a given contact, but doing so may overestimate the skill level of an agent. Thus, it is preferable to apply points to skills that the intent analyzer 232 found significantly relevant to the contact.

The intent analyzer 232 usually applies these points based on the successful completion of a contact and updates the information in the agent and contact selector 220. This enables the agent and contact selector 220 to be kept up to date with the agent's current skill levels, rather than waiting until an audit is performed and the update is entered. The next incoming contact will be assigned more accurately because the agent and contact selector 220 is utilizing updated information and the efficiency of the contact center will increase.

Referring now to FIGS. 3A and 3B, the organization of information containers in the server 110 will be described in accordance with embodiments of the present invention. A work item container 300 is initially created when a work item, i.e. a contact, enters a contact center. The work item container 300 is a logical data container where information discovered about the contact by an IVR, intent analyzer 232, or human agent is stored throughout the life of the contact in the contact center. Specifically, the intent analyzer 232 determines what intents are associated with a given contact and that information is stored in the intent type field 304. Another field that is included in the work item container 300 is a point value field 308. The point value assigned to each intent is stored in the point value data field 308. Each intent may be given the same value as depicted in FIG. 3a, however, intents may also be assigned points based upon their relative difficulty of completion, percentage accuracy, past escalations by that customer on the same topic, and even a mathematical function f(x) (where x could be a numerical value such as percentage accuracy, and f(x) could be a non-linear function), and the like. Additionally, the determination of percent relevance or accuracy for each intent is input into a relevance field 312. The relevance of each intent may be computed according to various algorithms including, keyword counts, keyword relevance, related word counts, related word relevance, statistical relevance, mathematically calculated functional relevance, etc. A weighted value field 316 may also be included in the work item container 300. The weighted value field 316 contains the weighted relevance or accuracy of each determined intent. Typically, the weighted value is the point value multiplied by the percent relevance. This allows each intent to be applied as points to agent skills. Alternatively, the raw point values may be added to the skill point values of the agent upon successful completion of the contact or subsets of each may be used to update agent skill levels.

The agent container 320 exists for each agent that works in a given contact center. The agent's information, including first name, middle name, last name, and other identification data are stored in fields 324, 328, 332, and 336. As can be appreciated, more or less fields may exist for the storage of the agent information. The agent container 320 also includes a skill type field 340 corresponding to various skills in a given contact center. Skills may be related to a particular product, for example, skill 1 may be the agent's overall familiarity with product A, and skill 2 may correspond to product B. The point value the agent has for each skill is maintained in the point value field 344. The point value field 344 maintains the most up-to-date information for the agent skills. Typically, the higher the point value for a given skill, the more skilled that agent is at handling contacts requiring that skill. However, other point systems can be envisioned that assign lower points levels to skills in which the agent is more qualified. The agent and contact selector 220 uses the skill point value information to determine which agent a given contact should be assigned to, or which queue a particular agent can be a part of. For instance, an agent with a total point value equal to 20 for skill 2 may not be eligible to service contacts with intents directed toward skill 2. Essentially, the agent has not accumulated enough points for skill 2 to be considered qualified. That same agent may have 55 points for skill 3 and may therefore be eligible to service contacts with intents related to skill 3. In order to map intents to skills a related intent field 348 exists within the agent container 320. This field helps create an association between an agent's skills and the intents of a contact. The related intent field 348 may be populated every time the agent begins servicing a new contact or may be permanent. Alternatively, or in combination with the related intent field 348, the mapping of intents and skills could be accomplished by creating an additional data field in the work item container 300 that identifies related skills for each intent listed in the intent type field 304.

A skill may have several intents associated with it, as can be seen with skill 1 in FIG. 3B. For example, skill 1 may correspond to an agent's knowledge of say product Z. The intents associated with skill 1 may be sales of product Z, servicing of product Z, warranty questions about product Z, and so on. If the intent analyzer 232 determines that more than one of these intents may be associated with a given contact, then the intent analyzer 232 can be more certain that the contact will relate to skill 1. Upon successful completion of the contact, the agent may be given points for each intent associated with skill 1. However, that may lead to double counting, so instead, the agent may only be given an average of all intent points for skill 1, or may be given the points from only the most relevant intent.

In an alternative embodiment, a particular skill set may be divided into ability tiers. An agent may continue to accumulate points until they reach the next tier. Then their points are set back to zero or some other number to start counting up for the next tier. Many other schemes of updating skill point values can be envisioned, each of which should be construed as encompassed by embodiments of the present invention.

Figure 4:
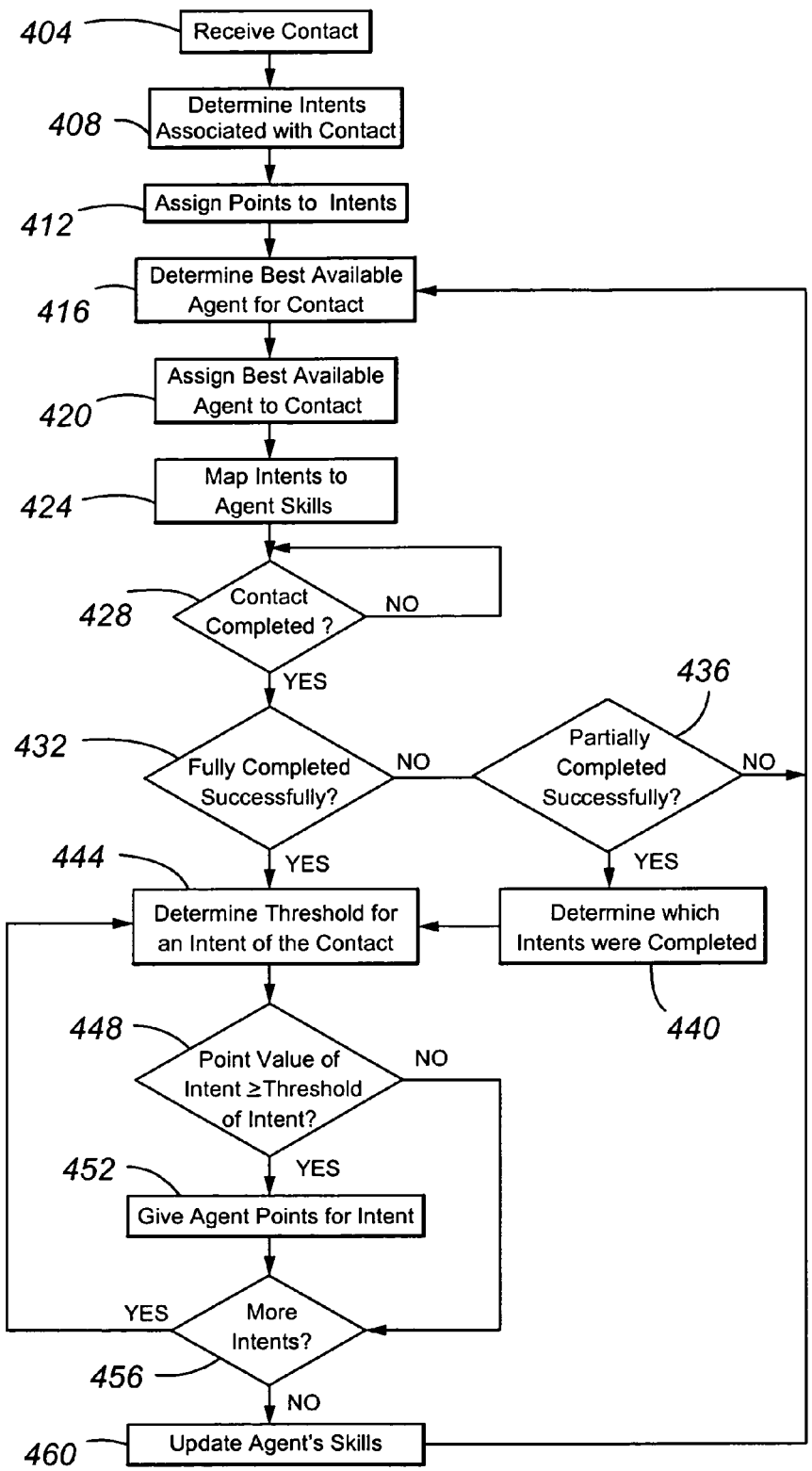
FIG. 4 is a flow chart depicting a method of automatically determining and updating an agent's skill level in accordance with embodiments of the present invention.

Referring now to FIG. 4, a method of automatically updating an agent's skills will be described in accordance with embodiments of the present invention.

In step 404, a contact is received in a contact center. The contact can be in the form of at least one of a phone call, a VoIP call, a chat, an email, a fax, a video call, an SMS/MMS message, instant message, etc.

In step 408 the contact information is determined along with the intents associated with the contact. When a contact is received, the customer is identified by known techniques including an information retrieval agent, by Dialed Number Identification Service (DNIS) digit collection and analysis, originating email address, chat session user Id, computer IP address, SIP identifier, voice recognition, or any other contact identification system. Customer information can be solicited, such as by an agent employed by the central enterprise network 100, the IVR 122, workflow block, or other techniques known to those of ordinary skill in the art. Examples of customer information include product or service interest requirements, customer location, level of assistance needed, timing constraints, priority level of the contact, customer presence information, personal customer information, and historical business information relating to the customer or organization.

The customer information is stored in various fields of the work item container 300. The customer information may be useful in determining the intents of a given contact. The intent analyzer 232 typically evaluates the body of the message to determine the intent, but additional customer information may assist the intent analyzer 232 in determining the intent(s) of the contact with greater accuracy. For example, if the contact was initiated by an existing customer who purchased product B, the customer information may reveal to the intent analyzer 232 that this customer purchased product B two weeks ago. The intent analyzer 232 may be able to conclude with great accuracy that one intent of the contact is to receive support for product B. The intent analyzer 232 continues to evaluate the contact until it has determined every intent that it can for the given contact.

Once all of the intents have been identified, each intent is assigned points in step 412. As noted above, intents may be given point values that are equal initially, then when multiplied by the intent's respective percent relevance, a new point value may be assigned to the intent in the form of a weighted value or an updated point value. The intents that the intent analyzer 232 identified with the greatest perceived accuracy are generally given the highest point values. Intents that were identified with a lower perceived accuracy may be given lower point values.

In step 416 the intent analyzer 232 forwards the intent information for the contact on to the agent and contact selector 220 where the best available agent is determined for the contact. The best available agent may correspond to a particular skill queue or may correspond to the best agent who is currently not servicing another contact. After the contact selector 220 determines the best place for the contact, the contact is assigned to the best available agent, or agent queue, in step 420.

The intents are mapped to agent skills in step 424. The mapping step uses the mapping table of FIG. 9 and determines a relationship between the determined intents and the skill types an agent needs to address the determined intents. The intents and corresponding skills may be included in the work item container 300 and/or in the agent container 320 to display the relationship between the intent and requisite skill. The mapping may be done when the contact is placed into a queue or when the contact is connected to an agent for servicing. Regardless of when the mapping step occurs, the contact will eventually be connected with an agent.

In step 428 it is determined if the agent has completed servicing the contact. The method stays at step 428 until the agent has completed the contact. A contact may have been completed successfully, meaning the agent serviced every question in the contact. A contact may also not have been completed successfully. For example, the agent may only have addressed a subset of the contact's questions.

In step 432 it is determined if the contact was completely successfully serviced. If the contact was not completely successfully serviced, then it is determined if the contact was at least partially successfully serviced in step 436. If the contact was not even partially successfully serviced, then the contact is sent back to the agent and contact selector 220 to be sent to a different skill queue or agent in step 416. However, if the contact was partially serviced, then it is determined which intents were successfully serviced. This can be accomplished by having the intent analyzer 232 evaluate the interaction between the agent and the contact to determine what intents were addressed, or not addressed. The agent who addressed a subset of the intents associated with the contact may also update the work item container 300, through his/her workstation, to reflect which intents were properly serviced and which intents were not.

In step 444 a threshold is determined for a first intent of the contact. A threshold may correspond to a minimum acceptable accuracy or percentage accuracy of the intent. For example, a threshold for the first intent may be that the intent was determined to be a part of the contact with at least a 50% chance of relevance. The threshold may also correspond to a minimum required weighted value or absolute point value. Additionally, a threshold may correspond to the amount of time it took for the agent to service the contact. If the agent took an extraordinarily long amount of time to service a relatively simple contact, then the agent should not receive full points, if any points, for successfully servicing that contact.

In step 448 it is determined if the first intent's point value met the determined threshold for that intent. For instance, the threshold may be that the intent had to have at least 2.5-weighted value points. The weighted value points are based on the point value and the percent relevance. If the point value of the intent does not meet or exceed the determined threshold, then the agent is awarded no skill points for addressing that particular intent, and the method proceeds to step 456. If the point value for the first intent is greater than the determined threshold, then the agent is awarded points to his/her cumulative skill point value related to that intent in step 452.

If the first intent is mapped with a single skill then that skill receives the full amount of points associated with the intent in step 452. However, if the intent is mapped to several skills, then the points from that intent may be distributed evenly across each skill, awarded fully to each skill, or supplied in various proportions to each or a subset of all skills, depending upon the determined relevance and importance of the intent to each skill. Thereafter, the method proceeds to step 456, where it is determined if more intents were successfully completed by the agent. If more intents were identified and addressed by the agent then the method returns to step 444.

Once all intents have been evaluated according to their point values, the agent's skills in the agent container 320 are updated in step 460. The point values for the intents that met the determined threshold are added to the related skills for the agent and those skills associated with intents that did not meet the threshold do not receive points for those intents. The method returns to step 416 where the intent analyzer 232 updates all of the agent's information automatically and the agent and contact selector 220 is now able to make a more informed decision when it receives the next contact. Additionally, if the contact was only partially completed, the contact is sent back to step 416 to be serviced by another agent of the contact center.

Figure 5:
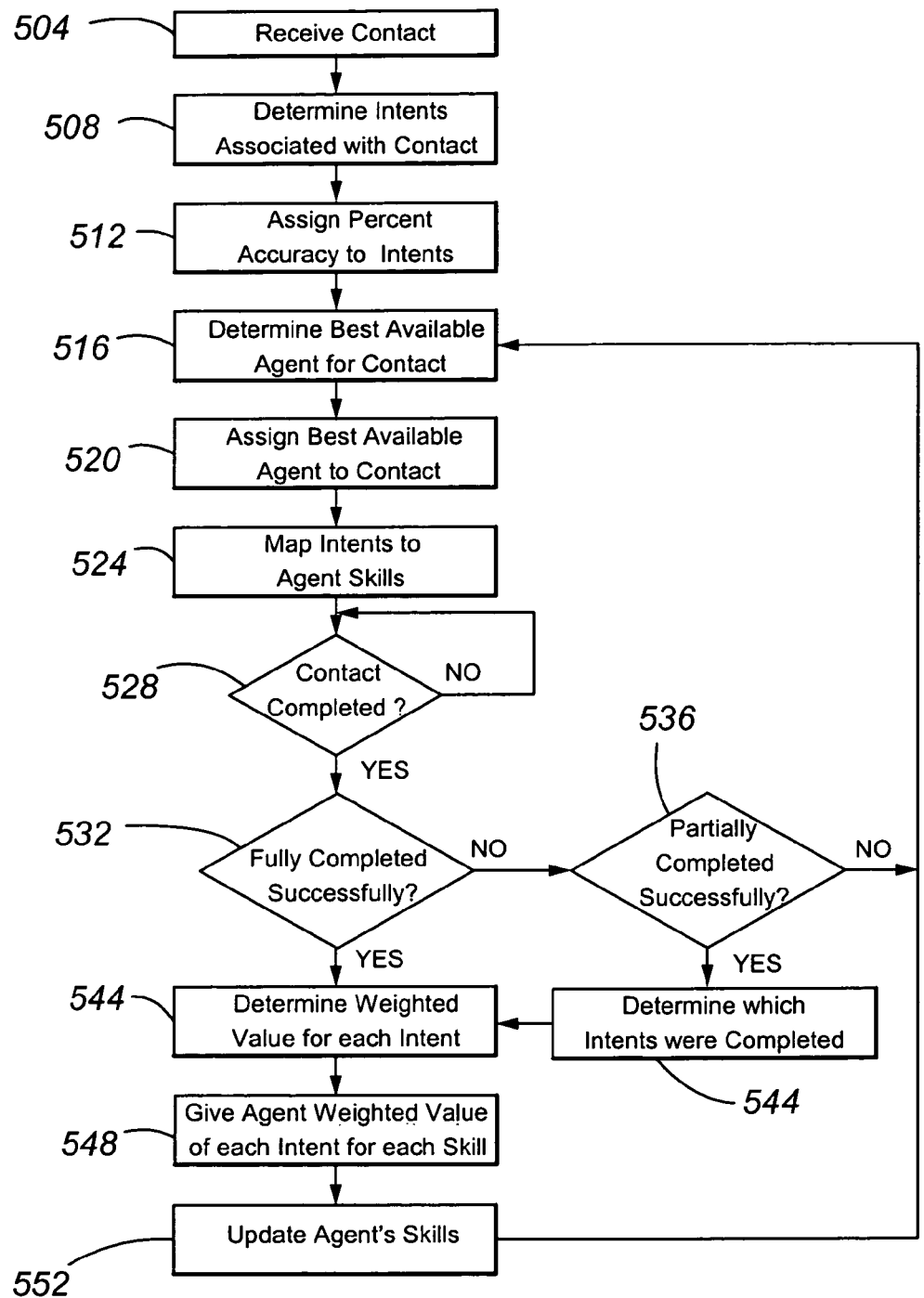
FIG. 5 is a flow chart depicting an alternative method of automatically determining and updating an agent's skill level in accordance with embodiments of the present invention.

Referring now to FIG. 5, another method of automatically updating skill levels for an agent is described in accordance with embodiments of the present invention.

In step 504 a contact is received in the contact center. As noted above, the contact can be in the form of one or more different media types.

In step 508 the intent analyzer 232 determines the intents associated with the contact. When each intent is determined to possibly be a part of the contact, the intent analyzer 232 also determines how confident it is in its determination. The intent analyzer 232 does not automatically assume that every intent it has identified is definitely a part of the contact. Rather, logic is built into the intent analyzer 232 to allow it to make a determination of how accurate it believes its determination of intents are. The intent analyzer 232 assigns a determined intent a percent relevance in step 512 and updates the fields in the work item container 300 accordingly.

Once the percent relevance of every intent has been determined, and the work item container 300 has been updated, the agent and contact selector 220 determines the best available agent or skill queue for the contact in step 516. The agent and contact selector 220 assigns the contact to the best available agent or skill queue in step 520 and the intents of the contact are mapped to the skills of the agent as noted above. As can be appreciated, the mapping of intents to skills may be done prior to assigning the contact to an agent or queue, rather than waiting until the contact is assigned. In fact, it is preferable to maintain a mapping of intents to skills in the work item container 300. This ensures that the mapping exists for the life of the contact in the contact center, not just for the duration of servicing the contact. The agent that initially gets connected to the contact may not be the only agent to service that contact and subsequently it is beneficial to maintain a mapping at the work item container 300, instead of at the agent container 320.

Once the agent is connected to the contact, he/she begins to attempt to service the contact. In step 528, it is determined if the contact has been completed. If not the method stays at step 528 until the agent is done servicing the contact. In step 532 it is determined if the agent fully serviced the contact successfully. If the contact was successfully completed, then each intent is given a non-zero point value for completion and the method proceeds to step 544 where weight values for completed intents are determined for the agent that successfully serviced the intents. If the contact was not completely serviced then it is determined if the contact was partially serviced in step 536. If the contact was not even partially serviced, then the contact still has all of its questions outstanding and needs to be serviced by another agent, thus the method returns to step 516. If the contact was partially serviced, then the intent analyzer 232 determines what portions of the contact were successfully addressed in step 540. The intents that correspond to successfully completed portions of the contact receive a non-zero point value for that agent, whereas intents that are associated with portions of the contact that were not successfully completed are given a zero point value for that agent.

In step 544 the weight values for each successfully completed intent are determined. This can be done, for instance, by multiplying the percent relevance by the point value given to each intent. This means the intents that were completed (i.e., intents that were correctly addressed) will receive some non-zero weighted value while those that were not completed will receive no weighted value.

In step 548, the weighted values for each intent are added to their associated skills. In one embodiment, every completed intent corresponds to some amount of points for the skills associated with the intent. The skills associated with intents that had a higher percent relevance will ultimately receive more points than the skills associated with intents that had a lower percent relevance. For example, a first intent may have been given a 90% chance of relevance with the contact and a second intent may have been given only a 15% chance of relevance with the contact. The percent relevance, as determined by the intent analyzer 232, corresponds to how sure the intent analyzer 232 is that the contact contains that intent. Since the intent analyzer 232 is very confident that the first intent was actually a part of the contact, it can be stated with the same amount of confidence that the skill required to complete the first intent is required to successfully service the contact. Likewise, the intent analyzer 232 is less confident that the second intent was actually a part of the contact. Therefore, with the same amount of confidence, it can be stated that the skill required to complete the second intent was required to successfully service the contact. This way when the skills of the agent are automatically updated upon successful completion of the contact, the skill associated with the more relevant intent will receive a higher percentage of points because the chances are higher that the associated skill was used.

Once all of the skills have been awarded the weighted points, the agent's skill levels in the agent container are updated in step 552. The updated agent's skills are then available for use by the agent and contact selector 220 to assign the next incoming contact in step 516. Additionally, if any portion of the first contact was not successfully serviced, then the contact is sent back to the agent and contact selector 220 where another qualified agent or queue is determined for the contact.

Another operational embodiment of the intent analyzer 232 will now be discussed with reference to FIGS. 6-8.

Figure 8:
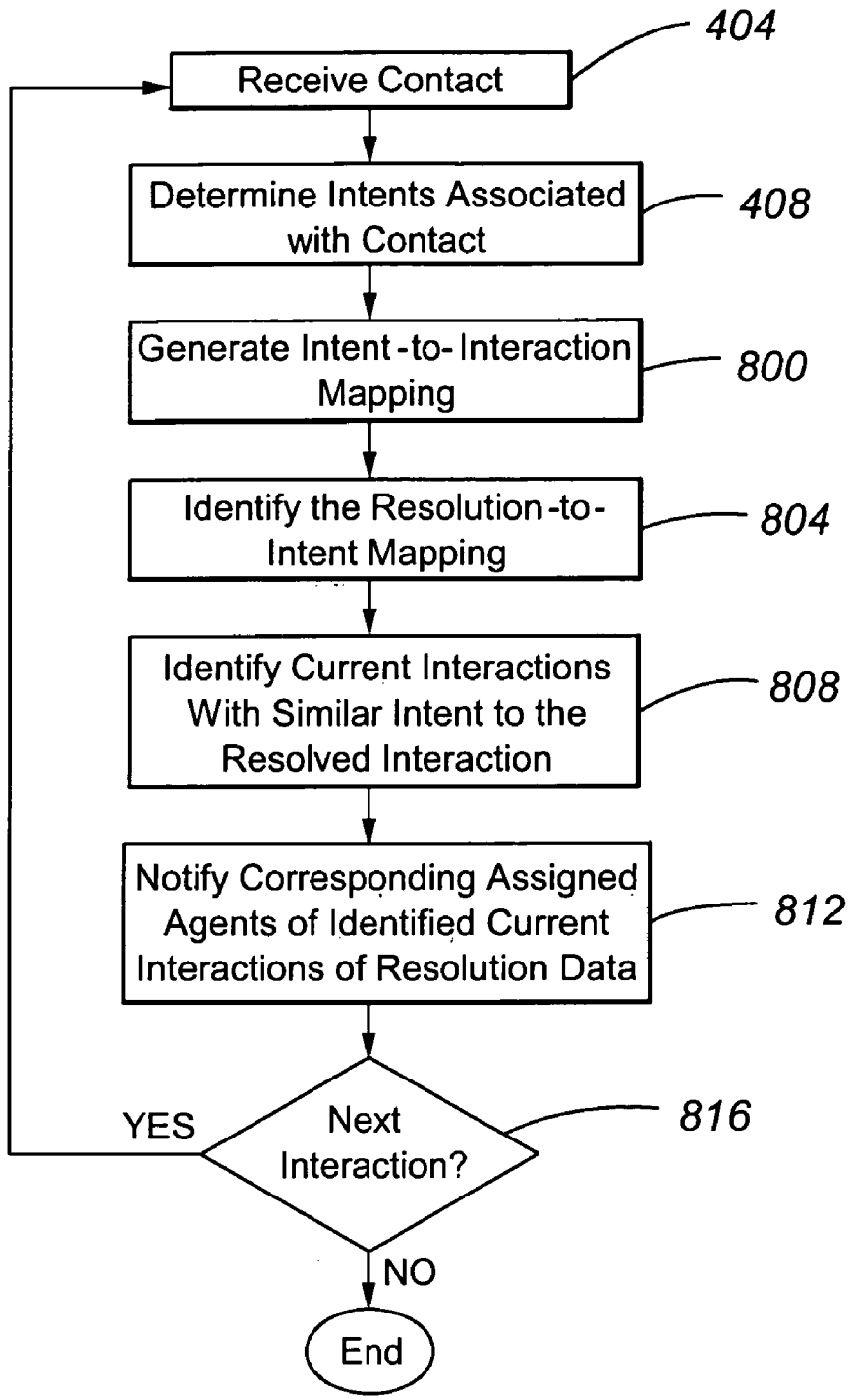
FIG. 8 is a flow chart depicting an alternative embodiment of the invention.

With reference to FIG. 8, the analyzer 232, in step 800, generates an intent-to-interaction mapping, such as that shown in FIG. 6. The mapping correlates the currently identified intents with the corresponding unresolved interactions. This map effectively states: for the identified first intent, interactions A and B exhibit that intent. Similarly, suppose that interaction X enters the system and the analyzer 232 determines that interaction X exhibits the same first intent. The intent-to-interaction mapping is now updated so that the first intent now maps not only to interactions A and B but also interaction X. Over time, different intents may be identified, and the analyzer will update the mapping, where M is less than or equal to N (meaning that, for a given intent, there could be one or more currently assigned interactions that exhibit the intent). The corollary holds true as well; there could be multiple intents for a given interaction. For example, a customer can ask multiple questions in an email. As shown in FIG. 6, the analyzer handles this simply by having an interaction be mapped to multiple intents.

In step 804, the analyzer identifies the resolution-to-intent mapping, such as that shown in FIG. 7. When an agent resolves a particular interaction, the analyzer gets involved in generating the resolution-to-intent mapping. This is the simple step of extracting out the resolution data and the intent for at least the interaction that was just resolved. The analyzer may also extract out the resolution data for a predetermined set of interactions that had been resolved some time earlier. The contact center may periodically review the historical resolution data for a selected intent and select a subset as providing a highly useful and/or beneficial example of how to properly resolve a contact having the selected intent. As shown in FIG. 7, the first intent maps to interactions F and G (either or both of which may be historically significant resolutions of the first intent), which respectively have resolution data F and G. In other words, the mapping provides the resolution data for the various interactions containing a selected intent.

In step 808, the analyzer identifies the current interactions with similar intent(s) to the selected recently resolved interaction. In this step, the analyzer determines all of the interactions that are currently mapped to a selected intent. With the earlier valid assumption that interactions with similar intent may possibly have the same resolution, the analyzer has already determined the potential solution for these interactions that are currently assigned to agents (even if the agent has not yet started working on them).

In step 812, the analyzer notifies the agents assigned to the unresolved interactions of the resolution data yielded by the mapping step 808. In other words, the analyzer states "for this particular interaction, here is one or more potential resolutions for your consideration". As will be appreciated, this embodiment can notify agents not only after assignment of a contact but also at the time of assignment. The intent-to-resolution map of FIG. 7 provides potential resolutions for an intent when that intent becomes known to the contact center.

In step 816, the analyzer waits for the next interaction to be received by the contact center.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of automatically determining skill levels of an agent in a contact center, comprising:
   receiving a first contact from a first customer;
   determining a first intent associated with the first contact, the first intent being associated with a first skill, wherein the first intent is a topic of the first contact;
   assigning a point value for the first intent;
   after determining a point value for the first intent, connecting the first contact with a first agent, the first agent having an associated set of skills; and
   after the first agent has successfully serviced the first contact, updating a skill level of a first skill in the first agent's set of skills to indicate that the first agent has increased proficiency in the first skill, wherein an amount of update of the first skill level is associated with the assigned point value of the first intent.

2. The method of claim 1, wherein the set of skills includes the first skill and wherein the updating step comprises:
   increasing a skill level of the first agent in the first skill.

3. The method of claim 2, wherein the assigning a point value step comprises:
   assigning weight to the point value; and
   wherein the skill level is increased by at least a portion of the point value based on the weight.

4. The method of claim 3, wherein the weight is based on a degree of relevance of the first intent to the first contact.

5. The method of claim 3, wherein the updating step comprises:
   comparing at least a portion of the point value with a threshold value;
   when the at least a portion of the point value exceeds the threshold value, performing the update; and
   when the at least a portion of the point value is less than the threshold value, not performing the update.

6. The method of claim 1, wherein updating the skill level is not performed when the first agent has not serviced the first contact successfully.

7. The method of claim 1, further comprising:
   updating a first set of data structures mapping intents to active contacts to associate the first intent with the first contact;
   when the first contact is serviced, associating resolution information from servicing the first contact with the first intent;
   identifying a second unserviced contact having the first intent, wherein a second agent is assigned to service the second contact; and
   notifying the second agent of the resolution information.

8. The method of claim 7, wherein notifying the second agent is performed when the second contact is assigned to the second agent.

9. A contact center, comprising:
   a plurality of agent communication devices operable to service customer contacts;
   a plurality of agents to operate the plurality of agent communication devices, each of the agents having an associated set of skills; and
   an input operable to receive a first contact for servicing by the plurality of agent communication devices; and
   an intent analyzer operable to:
      determine a first intent and a second intent of the first contact, the first intent being associated with a first skill and the second intent being associated with a second skill, wherein the first intent is a first topic of the first contact and the second intent is a second topic of the first contact;
      assign a first point value to the first intent;
      assign a second point value to the second intent;
      after assigning the first point value to the first intent and second point value to the second intent, connect the first contact with a first agent, the first agent having an associated set of skills; and
      after the first agent has successfully serviced the first contact, update a first skill level for the first skill by an amount based on the first point value and a second skill level for the second skill by an amount based on the second point value to indicate that the first agent has increased proficiency in the first skill and second skill.

10. The contact center of claim 9, wherein the first skill level is increased by at least a first portion of the first point value and the second skill level is increased by at least a second portion of the second point value.

11. The contact center of claim 9, wherein the intent analyzer operations include:
    assigning the first point value to the first intent and assigning the second point value to the second intent, wherein the first point value and the second point value are different.

12. The contact center of claim 10, wherein the first portion is a function of a first degree of relevance of the first intent to the first contact and the second portion is a function of a second degree of relevance of the second intent to the first contact.

13. The contact center of claim 10, wherein the intent analyzer operations include:
    comparing the first portion of the first point value with a threshold value;
    when the first portion of the first point value exceeds the threshold value, performing an update operation; and
    when the first portion of the first point value is less than the threshold value, not performing an update operation.

14. The contact center of claim 9, wherein update operation is not performed when the first agent has not successfully serviced the first contact.

15. The contact center of claim 9, wherein the intent analyzer is further operable to:
    update a first set of data structures mapping intents to active contacts to associate the first and second intents with the first contact;

when the first contact is serviced, associate resolution information from servicing the first contact with the first intent and second intent;

identify a second unserviced contact having either the first intent or the second intent, wherein a second agent is assigned to service the second contact; and notify a second agent of the resolution information.

16. The contact center of claim 15, wherein the second agent is notified of the resolution information when the second contact is assigned to the second agent.

17. A computer-readable medium having computer-executable instructions being stored on a non-transitory, tangible medium, the computer-executable instructions causing a computer system to execute a method, the method comprising:

receiving a first contact from a first customer;

determining a first intent and a second intent of the first contact, the first intent being associated with a first skill that is automatically assigned a first point value and the second intent being associated with a second skill that is automatically assigned a second point value, wherein the first intent is a first topic of the first contact and the second intent is a second topic of the first contact;

updating a first set of data structures mapping intents to active contacts to associate the first intent and the second intent with the first contact;

when the first contact is serviced, determining that resolution information associated with the serviced first contact is relevant to the first intent but not to the second intent;

associating the resolution information from servicing the first contact with the first intent but not the second intent;

connecting the first contact with a first agent, the first agent having an associated set of skills.

after the first agent has serviced the first contact, updating a first skill level associated with the first skill and a second skill level associated with the second skill to indicate that the first agent has increased proficiency in the first and second skills;

identifying a second unserviced contact having the first intent, wherein a second agent is assigned to service the second contact; notifying a second agent of the resolution information;

receiving a third agent unserviced contact having the second intent; and forgoing notifying the third agent of the resolution information.

18. The computer-readable medium of claim 17, wherein notifying is performed when the second contact is assigned to the second agent.

* * * * *

UNITED STATES PATENT AND TRADEMARK OFFICE
CERTIFICATE OF CORRECTION

PATENT NO. : 8,238,541 B1
APPLICATION NO. : 11/344733
DATED : August 7, 2012
INVENTOR(S) : Rajeev P. Kalavar It is certified that error appears in the above-identified patent and that said Letters Patent is hereby corrected as shown below:

At Column 20, line 8, please delete "." and replace it with --;-- therewith.

Signed and Sealed this
Nineteenth Day of February, 2013

Teresa Stanek Rea
*Acting Director of the United States Patent and Trademark Office*